R. A. MILNE & F. H. BEDFORD.
VALVE.
APPLICATION FILED JAN. 22, 1910.

994,268.

Patented June 6, 1911.

Witnesses
O. B. Baenziger
J. L. Howlett

Inventors
Russell A. Milne,
Frank H. Bedford.
By T. S. Wheeler, Attorney.

UNITED STATES PATENT OFFICE.

RUSSELL A. MILNE AND FRANK H. BEDFORD, OF DETROIT, MICHIGAN.

VALVE.

994,268.

Specification of Letters Patent.   Patented June 6, 1911.

Application filed January 22, 1910.  Serial No. 539,476.

*To all whom it may concern:*

Be it known that we, RUSSELL A. MILNE and FRANK H. BEDFORD, citizens of the United States, residing at Detroit, in the county of Wayne, State of Michigan, have invented certain new and useful Improvements in Valves; and we do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to valves, and consists in the construction and arrangement hereinafter more fully set forth and pointed out in the claim.

The object of the invention is to provide a valve of the globe type of comparatively simple and inexpensive construction, wherein the arrangement is such as to insure a perfect seating of the valve, and wherein provision is made for so moving or turning the valve as it is operated as to continually present a new surface to the seat, obviating the liability of leakage through wear.

The above object is attained by the structure illustrated in the accompanying drawings, in which:—

Figure 1:
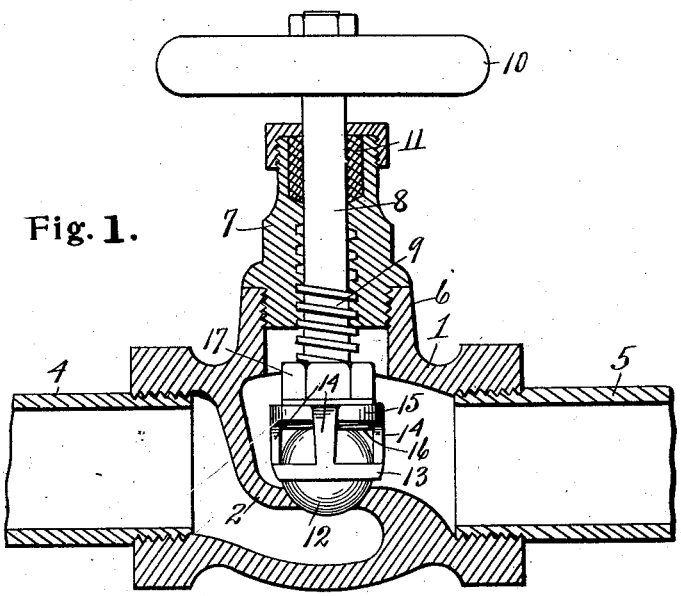
Figure 2:
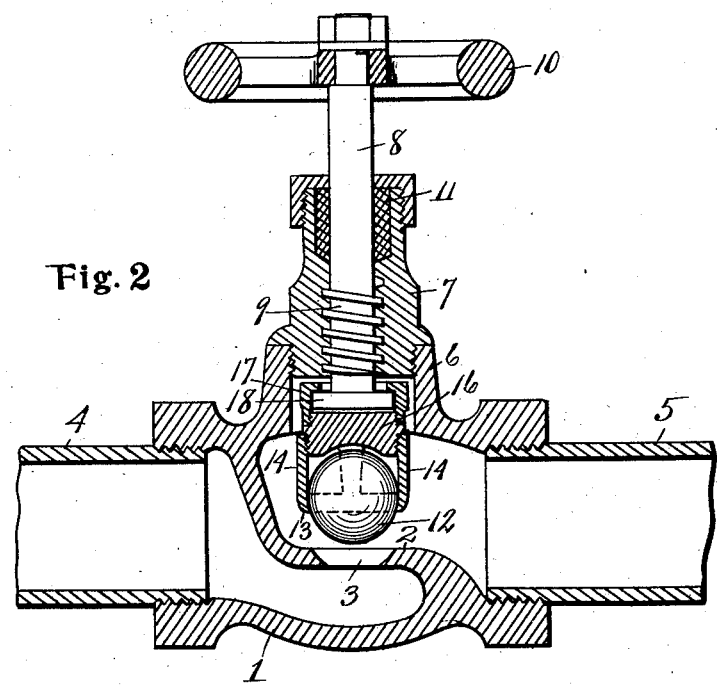

Figure 1 is a sectional view through a valve and its pipe connections embodying our invention, the valve being shown in the closed position. Fig. 2 is a similar view showing the valve raised from its seat.

Referring to the characters of reference, 1 designates the valve case of an ordinary globe valve wherein is the usual dividing partition 2. Formed through said partition is an opening 3 which connects the induct and educt sides of the valve chamber with which the pipes 4 and 5 respectively communicate. Screwed into the boss 6 of the valve case is a plug 7 through which passes the stem 8, said stem having a thread 9 which works in the plug 7 to raise and lower said stem as the hand wheel 10 at the upper end thereof is turned. The valve stem passes through the usual stuffing box 11 to prevent the escape of fluid therearound.

The valve comprises a steel ball 12 adapted to seat in the opening 3. Embracing said ball below the center thereof is a ring 13, the opening through which is of such size as to prevent the passage of the ball therethrough. Extending upwardly from the ring 13 are the fingers 14 which are attached to an upper ring 15, said rings, together with the connecting fingers, forming a cage which confines the ball in place, but in which said ball is loosely held. The upper ring 15 is internally threaded and screwed thereinto is a block 16 having a concaved under face adapted to fit over the arc of the ball. The block 16 projects some distance above the ring 15 of the ball cage and is threaded to receive the hollow nut 17 which is screwed thereon and within which is confined the flanged head 18 at the lower end of the valve stem, the arrangement being such as to effect a swivel connection between said stem and the valve cage. By this arrangement the ball is freely held within the cage so as to revolve therein, but is prevented dropping from the cage owing to the small diameter of the lower ring 13. When the valve is closed through the rotation of the stem 8, it is crowded onto its seat by engagement of the block 16 with the upper arc thereof, as shown in Fig. 1, the lower end of the valve stem bearing directly upon said block, thereby effecting a rigid connection between the ball and valve stem at the time the ball is forced onto its seat. When the valve is opened, the ball is free to turn in the valve cage as soon as the block 16 is raised therefrom. This freedom of movement which the ball valve is allowed when raised, permits it to rotate, an arrangement which insures the presentation to the valve seat of a new surface upon the ball valve each time the valve is opened and closed, obviating any unequal wearing of the ball and insuring a perfect closure at all times when the valve is seated.

Having thus fully set forth our invention, what we claim as new and desire to secure by Letters Patent, is:—

A valve comprising a valve case having a valve seat therein, a valve stem rotatable in and vertically movable through said case, said stem being provided with a flanged head at its lower end, a valve cage tapped at its upper end, a block screwed into the tapped upper end of said cage and engaged by the lower end of the valve stem, a hollow nut screwed onto the upper end of said block and loosely embracing the flanged head of the valve stem, said block having a concavity in its under face, and a ball valve loosely confined within said cage adapted to be received in the concavity in said block when the valve is closed, said valve being actuated to close upon the valve seat and rise therefrom as the valve stem is moved vertically.

In testimony whereof, we sign this specification in the presence of two witnesses.

RUSSELL A. MILNE.
FRANK H. BEDFORD.

Witnesses:
I. G. HOWLETT,
O. B. BAENZIGER.